United States Patent Office 3,734,886
Patented May 22, 1973

3,734,886
STABILIZED RUBBER CONTAINING 4-NITROSODI-
PHENYLHYDROXYLAMINE OR DERIVATIVE
THEREOF
David Dodman, Peter Laithwaite, Boris Nicholas Ley-
land, and Peter Michael Quan, Manchester, England,
assignors to Imperial Chemical Industries Limited, Lon-
don, England
No Drawing. Filed Nov. 29, 1971, Ser. No. 203,005
Claims priority, application Great Britain, Dec. 10, 1970,
58,688/70
Int. Cl. C08f 45/60
U.S. Cl. 260—45.9 R          5 Claims

ABSTRACT OF THE DISCLOSURE 4-nitrosodiphenylamines and salts and isocyanate ad-
ducts of these are antioxidants for rubbers. These com-
pounds are resistant to extraction from the rubber by
solvents.

This invention relates to the stabilisation of natural
and synthetic rubbers by the use of nitrosodiphenylhy-
droxylamines and derivatives of these.

According to the invention there are provided stabilised
rubber compositions containing in stabilising amount a
4-nitrosodiphenylhydroxylamine in which one or both
benzene rings may carry an alkyl, aryl, halogen or halo-
alk group or a salt or isocyanate adduct thereof.

The rubber may be natural rubber or for example a
synthetic rubber which is a polymer or copolymer derived
from a conjugated diene, such as cis-polybutadiene, cis-
polyisoprene, other polymers of butadiene or isoprene,
polymers of 2-chlorobutadiene or coplymers of any of the
foregoing with each other or with isobutene, styrene,
acrylonitrile, methyl methacrylate or other well-known
polymerisable compounds used in the manufacture of syn-
thetic rubbers.

As 4-nitrosodiphenylhydroxylamines there are men-
tioned 4-nitrosodiphenylhydroxylamine itself and N-(3,5-dichloro-4-nitrosophenyl)-N-(2,6-dichlorophenyl)
hydroxylamine,
N-(2-chloro-4-nitrosophenyl)-N-(3-chlorophenyl)-
hydroxylamine,
N-(3,5-dimethyl-4-nitrosophenyl)-N-(2,5-dimethyl-
phenyl)hydroxylamine, and
N-(2-trifluoromethyl-4-nitroso-phenyl)-N-(3-trifluoro-
methylphenyl)hydroxylamine.

As salts there are mentioned for example metal salts
such as sodium, potassium, magnesium salts and salts with
other metals of Groups Ia, IIa, and IIb of the Periodic
Table, especially the calcium salt and also ammonia, amine
and quaternary ammonium salts.

The nitroso compounds themselves have the disadvan-
tage that they are somewhat unpleasant to handle as
they stain the skin of operators. The metal salts, although
strongly coloured, are in effect free from this defect since
any stain is very readily washed out with water.

The salts, other than the alkali metal salts, are new
compounds. They are readily prepared by for example
reaction of the nitroso compounds with metal oxide or
hydroxides or ammonia or amines in aqueous media. The
salts are in general soluble in aqueous media and can be
obtained in solid form by evaporation of the aqueous
solution. The ammonium and amine salts are stabilised by
excess ammonia or amine and it is preferred to use them
in aqueous solution rather than to attempt to isolate them
before use.

It is also found that the p-nitrosodiphenylhydroxyl-
amines react with mono- bis-, or poly-isocyanates, espe-
cially aromatic isocyanates, to give addition compounds
which can be utilised instead of the 4-nitrosodiphenylhy-
droxylamines themselves. The adducts are advantageous
in that they have little effect on the curing characteristics
of the rubber compounds. These adducts are new com-
pounds. They are readily prepared by admixture of the
reactants, optionally with heating, and optionally in the
presence of a solvent such as ethyl acetate or toluene.

The amount of nitroso compound or salt or isocyanate
adduct thereof is conveniently from 0.1 to 4.0% and
preferably from 0.25 to 2.0% of the weight of rubber.
Larger or smaller amounts can however be used if de-
sired.

The nitroso compound or salt or isocyanate adduct
thereof may be incorporated into the rubber by conven-
tional methods. For example it may be mixed on a mill
with the unvulcanised rubber alone or with other com-
pounds used in rubber technology such as vulcanising
agents, sulphur, antiozonants, other antioxidants, retard-
ers, blowing agents, pigments, fillers, and waxes.

The compounds are particularly valuable for the pres-
ervation of vulcanised rubbers and have the advantage
over other antioxidants of being resistant to extraction
from the rubber by solvents.

The nitroso compounds, especially in the form of the
water-soluble salts, may be incorporated into rubbers in
latex form.

The invention is illustrated but not limited by the fol-
lowing examples in which all parts and percentages are
by weight unless otherwise stated.

EXAMPLE 1

2.5 parts of 4,4-diisocyanatodiphenylmethane and 4.2
parts of 4-nitrosodiphenylhydroxylamine are mixed and
warmed for a few minutes at 50° C. in a nitrogen atmos-
phere. 30 parts of ethyl acetate are then added and the
mixture is heated under reflux for 20 minutes. The mix-
ture is cooled and the required adduct is deposited as 5.0
parts of a brown solid which is collected, washed with a
little ethyl acetate, and dried.

EXAMPLE 2

Rubber mixes of the following composition are pre-
pared on a two-roll mill:

Smoked sheet natural rubber _____ 100
Zinc oxide _____ 3.5
Stearic acid _____ 3
High abrasion furnace black _____ 45
Processing oil _____ 3.5
Sulphur _____ 2.5
Cyclohexylbenzthiazylsulphenamide _____ 0.5
Antioxidant—as indicated.

The mixes are vulcanised for 15 minutes at 153° C.
and the vulcanisates in sheet form of 0.8 mm. thickness
are examined for antioxidant activity by determining the
time taken in hours for an absorption of 2% of their
weight of oxygen at 90° C. Comparable tests are carried
out with vulcanisates containing no antioxidant and con-
taining a commercial antioxidant, phenyl-$\beta$-naphthylamine
and, in each case, after extraction of the vulcanisate for
24 hours with a boiling mixture of acetone (100 volumes),
methanol (42 volumes) and trichloroethane (60 volumes).
The results below show that the nitroso compound is as
effective as phenyl-$\beta$-naphthylamine before extraction and,
in contrast to phenyl-$\beta$-naphthylamine, loses little of the
antioxidant effect after extraction and in certain instances
is actually improved.

| | 4-nitrosodiphenyl-hydroxylamine | | | | Phenyl-β-napthylamine | | |
|---|---|---|---|---|---|---|---|
| Percent on rubber hydrocarbon | 0 | 0.5 | 1.0 | 1.5 | 0.5 | 1.0 | 1.5 |
| Time in hours for absorption of 2% oxygen: | | | | | | | |
| Unextracted vulcanisate | 36 | 48 | 64 | 84 | 56 | 72 | 80 |
| Extracted vulcanisate | 16 | 50 | 72 | 104 | 20 | 16 | 6 |

EXAMPLE 3

The procedure of Example 2 is repeated using 1.0% of the sodium and calcium salts of 4-nitrosodiphenylhydroxylamine, 4-nitrosodiphenylhydroxylamine itself, and of phenyl-β-naphthylamine. The resuts are as follows:

| | Antioxidant | | | | |
|---|---|---|---|---|---|
| | None | Calcium salt | Sodium salt | 4-nitrosodiphenylhydroxylamine | Phenyl-β-naphthylamine |
| Time in hours for absorption of 2% oxygen: | | | | | |
| Unextracted vulcanisate | 32 | 59 | 46 | 48 | 45 |
| Extracted vulcanisate | 12 | 40 | 41 | 60 | 12 |

EXAMPLE 4

Rubber vulcanisates are prepared as in Example 2 but with incorporation of 0 or 2% of 4-nitrosodiphenylhydroxylamine, or 2% of the adduct prepared as described in Example 1. Oxygen absorption is measured as described in Examples 2 or 3 at a temperature of 100° C. rather than 90° C.

The Mooney Scorch time is measured at 120° C. Results are as follows:

| | Antioxidant | | |
|---|---|---|---|
| | None | 4-nitrosodiphenylhydroxylamine | Adduct |
| Time in hours for absorption of 2% oxygen at 100° C.: | | | |
| Unextracted vulcanisate | 13 | 25 | 20 |
| Extracted vulcanisate | 8 | 33 | 29 |
| Mooney Scorch: | | | |
| MIN plus 10 Mooney Units | 26' | 13' | 22' |

EXAMPLE 5

Latex formulations of the composition below are prepared using aqueous salts of 4-nitrosophenylhydroxylamine.

| | Parts |
|---|---|
| High ammonia natural rubber latex | 100 |
| Ethylene oxide/fatty alcohol condensate | 0.2 |
| Sulphur | 1.0 |
| Zinc diethyl dithiocarbamate | 1.0 |
| Zinc oxide | 1.5 |
| 4-nitrosodiphenylhydroxylamine salt | 1.0 |

The latex dispersion is flowed onto glass left at room temperature to dry giving a film of thickness about 1 mm. and cured by heating at 100° C. for 30 minutes. Samples of the vulcanisate are tested for oxygen absorption before and after extraction.

The results are as follows:

| | No antioxidant | Calcium salt | Sodium salt | Ammonium salt |
|---|---|---|---|---|
| Hours to 2% oxygen absorption: | | | | |
| Before extraction | 87 | 57 | 57 | 56 |
| After extraction | 8 | 34 | 22 | 20 |

We claim:

1. A stabilised rubber composition comprising a rubber which is natural rubber or a polymer or copolymer of a conjugated diene and from 0.1 to 4.0%, based on the weight of said rubber, of a 4-nitrosodiphenylhydroxylamine in which one or both benzene rings is unsubstituted or substituted with alkyl, aryl, halogen or haloalkyl; or sodium, potassium, magnesium, calcium, ammonium or amine salt thereof or an adduct thereof with an aromatic isocyanate.

2. A stabilised composition as claimed in claim 1 wherein the 4-nitrosodiphenyldroxylamine is 4-nitrosodiphenylhydroxylamine itself.

3. A stabilised composition as claimed in claim 1 wherein the salt is calcium.

4. A stabilised composition as claimed in claim 1 wherein the salt is an ammonium or amine salt.

5. A stabilised composition as claimed in claim 1 which contains an adduct of a 4-nitrosodiphenylhydroxylamine with an aromatic isocyanate.

References Cited

UNITED STATES PATENTS 2,930,777   3/1960   Leeper et al. _____ 260—45.9 R
3,384,613   5/1968   Parks _____ 260—45.9 R DONALD E. CZAJA, Primary Examiner M. I. MARQUIS, Assistant Examiner U.S. Cl. X.R.

260—45.75 R